United States Patent
Jeon et al.

(10) Patent No.: US 10,880,800 B2
(45) Date of Patent: Dec. 29, 2020

(54) METHOD AND APPARATUS FOR SUPPORTING MOBILITY OF TERMINAL IN WIRELESS COMMUNICATION SYSTEM

(71) Applicant: Samsung Electronics Co., Ltd., Suwon-si (KR)

(72) Inventors: Namryul Jeon, Suwon-si (KR); Seungil Oh, Suwon-si (KR); Daejoong Kim, Suwon-si (KR); Seungbo Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/372,826

(22) Filed: Apr. 2, 2019

(65) Prior Publication Data

US 2019/0320364 A1 Oct. 17, 2019

(30) Foreign Application Priority Data

Apr. 17, 2018 (KR) .................. 10-2018-0044277

(51) Int. Cl.
| | | |
|---|---|---|
| *H04W 36/08* | (2009.01) | |
| *H04W 8/08* | (2009.01) | |
| *H04W 88/10* | (2009.01) | |
| *H04W 76/11* | (2018.01) | |
| *H04W 72/04* | (2009.01) | |

(52) U.S. Cl.
CPC ............ *H04W 36/08* (2013.01); *H04W 8/08* (2013.01); *H04W 72/046* (2013.01); *H04W 76/11* (2018.02); *H04W 88/10* (2013.01)

(58) Field of Classification Search
CPC ... H04W 36/08; H04W 36/32; H04W 72/046; H04W 76/11; H04W 8/08; H04B 7/0695
See application file for complete search history.

(56) References Cited

U.S. PATENT DOCUMENTS

| | | | |
|---|---|---|---|
| 2012/0014425 A1 | 1/2012 | Zhuang et al. | |
| 2012/0021740 A1* | 1/2012 | Vaidyanathan | H04B 7/18506 455/431 |
| 2013/0072247 A1 | 3/2013 | Park et al. | |
| 2013/0143583 A1 | 6/2013 | Son et al. | |

(Continued)

FOREIGN PATENT DOCUMENTS

WO      2016-200302 A1   12/2016

OTHER PUBLICATIONS

International Search Report dated Jul. 8, 2019, issued in International Patent Application No. PCT/KR2019/003562.

(Continued)

Primary Examiner — Gary Mui
(74) Attorney, Agent, or Firm — Jefferson IP Law, LLP

(57) ABSTRACT

A base station and a method by the base station for supporting mobility of a terminal in a beamforming-based wireless communication system are provided. The method includes generating beam-related information for a plurality of terminals from beam measurements result received respectively from the plurality of terminals, detecting a path in a coverage area of the base station according to the beam-related information, and transmitting a message to the terminal determined to move along the path for supporting mobility based on the beam-related information.

20 Claims, 10 Drawing Sheets

(56) References Cited

U.S. PATENT DOCUMENTS

| | | | |
|---|---|---|---|
| 2014/0073329 A1* | 3/2014 | Kang | H04W 36/30 |
| | | | 455/439 |
| 2015/0078333 A1* | 3/2015 | Byers | H04W 36/32 |
| | | | 370/331 |
| 2015/0230263 A1* | 8/2015 | Roy | H04W 16/28 |
| | | | 455/452.2 |
| 2016/0241367 A1* | 8/2016 | Irmer | H04W 36/32 |
| 2016/0345222 A1 | 11/2016 | Axmon et al. | |
| 2017/0034758 A1 | 2/2017 | Lai et al. | |
| 2017/0048772 A1 | 2/2017 | Gheorghiu et al. | |
| 2017/0245192 A1 | 8/2017 | Sadri et al. | |
| 2017/0289867 A1 | 10/2017 | Fan et al. | |
| 2017/0367082 A1 | 12/2017 | Yu et al. | |
| 2018/0049274 A1* | 2/2018 | Kim | H04W 36/245 |
| 2018/0359299 A1* | 12/2018 | Chou | H04L 65/60 |
| 2019/0044611 A1* | 2/2019 | Treesh | H04B 7/18541 |
| 2019/0223043 A1* | 7/2019 | Geng | H04W 36/305 |
| 2019/0335376 A1* | 10/2019 | Huang | H04W 36/0061 |

OTHER PUBLICATIONS

European Partial Search Report dated Nov. 2, 2020, issued in a counterpart European Application No. 19789136.9-1220/3701745.

\* cited by examiner

FIG. 5

| Optimize handover of terminal | Staying time [sec] | Performance index (e.g., MCS) | Others |
|---|---|---|---|
| Start Cause | [Call setup, Handover-in, RRC Connection Reestablishment] | | |
| End Cause | [Call release, Handover out] | | |
| #Initial beam ID | ww.www | A | |
| #Next beam ID | xx.xxx | B | |
| ... | y.yyy | C | |
| #Last beam ID | zz.zzz | A | |
| Result of handover-out | [Success or failure] | | |
| Target of handover-out | Target cell ID/ Target Beam ID | | |

500

METHOD AND APPARATUS FOR SUPPORTING MOBILITY OF TERMINAL IN WIRELESS COMMUNICATION SYSTEM

CROSS-REFERENCE TO RELATED APPLICATION(S)

This application is based on and claims priority under 35 U.S.C. § 119(a) of a Korean patent application number 10-2018-0044277, filed on Apr. 17, 2018, in the Korean Intellectual Property Office, the disclosure of which is incorporated by reference herein in its entirety.

BACKGROUND

1. Field

The disclosure relates to 5th generation (5G) wireless communication (or next generation wireless communication). More particularly, the disclosure relates to a method and an apparatus for supporting mobility of a terminal in a wireless communication system.

2. Description of the Related Art

To meet the increasing demand for wireless data traffic since the deployment of 4th generation (4G) communication systems, efforts have been made to develop an improved 5G or pre-5G communication system. Therefore, the 5G or pre-5G communication system is also called a "beyond 4G network" communication system or a "post long-term evolution (LTE) system."

Implementation of the 5G communication system in ultra-high frequency (mmWave) bands, e.g., 60 GHz bands, is being considered in order to accomplish higher data rates. To mitigate a path loss of the radio waves and increase the transmission distance on the radio waves in the ultrahigh frequency, beamforming, massive multiple-input multiple-output (massive MIMO), full dimensional MIMO (FD-MIMO), array antenna, analog beamforming, and large scale antenna techniques are being discussed for 5G communication systems.

Further, in 5G communication systems, development for system network improvement is under way based on evolved small cells, advanced small cells, cloud radio access networks (RANs), ultra-dense networks, device-to-device (D2D) communication, wireless backhaul, moving network, cooperative communication, coordinated multi-points (CoMP), reception-end interference cancellation, and the like.

In addition, in the 5G system, hybrid frequency shift keying (FSK) and quadrature amplitude modulation (QAM) (FQAM) and sliding window superposition coding (SWSC) as advanced coding modulation (ACM) systems, and filter bank multi carrier (FBMC), non-orthogonal multiple access (NOMA), and sparse code multiple access (SCMA) as advanced access technologies have been developed.

On the other hand, the Internet, which is a human centered connectivity network where humans generate and consume information, is now evolving into the internet of things (IoT) where distributed entities, such as things, exchange and process information without human intervention. The internet of everything (IoE), which is a combination of IoT technology and big data processing technology through connection with a cloud server, has emerged. Technology elements, such as "sensing technology," "wired/wireless communication and network infrastructure," "service interface technology," and "security technology," have been demanded for IoT implementation; therefore, recently there has been research on a sensor network, machine-to-machine (M2M) communication, machine type communication (MTC), and so forth. Such an IoT environment may provide intelligent Internet technology services that create a new value for human life by collecting and analyzing data generated among connected things. IoT may be applied to a variety of fields including smart home, smart building, smart city, smart car or connected car, smart grid, health care, smart appliances, and advanced medical services through convergence and combination between existing information technology (IT) and various industrial applications.

In line with this, various attempts have been made to apply 5G communication systems to IoT networks. For example, technologies such as a sensor network, M2M communication, and MTC may be implemented by beamforming, MIMO, and array antennas, which correspond to 5G communication technologies. Application of a cloud RAN as the above-described big data processing technology may also be considered to be an example of convergence between the 5G technology and the IoT technology.

One of main technologies of the 5G communication system as described above is to use an ultra-high frequency (mmWave) the wavelength of which is greatly shorter than the wavelength of the existing radio frequency in order to implement faster communication with a large bandwidth. However, the high frequency band has very low permeability and diffraction, and thus a communication system using the ultra-high frequency should be operated based on the beamforming to heighten the transmission/reception rate and to widen the coverage area.

Specifically, in contrast with the 4G mobile communication system, the 5G communication system is planned to implement the maximum download speed of 20 Gbps and a response speed of 1 ms or less. In addition, the 5G communication system aims at the above-described implementation even in an environment of connection of more than 1,000,000 devices and high velocity of 500 km per hour. For this, the 5G communication system is planned to use an extended bandwidth as compared with that of the LTE through the use of ultra-high frequency band of 28 GHz that has not yet been used as the existing mobile communication frequency. However, because the high frequency band causes a small service coverage area and low permeability and diffraction, beamforming schemes are used to gather signals to one spot and to provide the gathered signals to a terminal.

The above information is presented as background information only to assist with an understanding of the disclosure. No determination has been made, and no assertion is made, as to whether any of the above might be applicable as prior art with regard to the disclosure.

SUMMARY

In a beam-based communication system as described above, a mobility function of a terminal is performed by beam change and handover. Such beam-based communication secures the mobility of a terminal in a beam-to-beam manner in which the communication drifts from one beam to another.

According to the beamforming technology, because signals to be transmitted or received are focused toward a specific point, transmission/reception lines should always be aligned, and if such an alignment is distorted in the beam change process, the electric field may be abruptly deteriorated.

For example, in case of a moving high-speed train, handover is triggered after an event occurs, in which the signal strength of the beam of a target cell becomes higher than the signal strength of the beam of a serving cell. In this case, serving beams of terminals located in the moving high-speed train and transmission/reception alignments among terminals may be distorted to abruptly deteriorate the electric field, and this may cause handover failure, performance deterioration, and dropped calls to occur.

Aspects of the disclosure are to address at least the above-mentioned problems and/or disadvantages and to provide at least the advantages described below. Accordingly, an aspect of the disclosure is to provide a method and an apparatus for supporting mobility of a terminal in a wireless communication system.

Additional aspects will be set forth in part in the description which follows and, in part, will be apparent from the description, or may be learned by practice of the presented embodiments.

In accordance with an aspect of the disclosure, a method by a base station is provided. The method includes generating beam-related information for a plurality of terminals from a beam measurement result received from the plurality of terminals, detecting a path in a coverage area of the base station using the beam-related information, and transmitting a message for supporting mobility based on the beam-related information to the terminal determined to move along the path.

According to an embodiment of the disclosure, detecting the path may further include identifying similarity between the beam-related information for two of the plurality of terminals by comparing the beam-related information for the two terminals with each other, and determining that a route in which the two terminals move forms the path if the similarity satisfies a specific condition.

According to an embodiment of the disclosure, identifying the similarity may include comparing beam identifier (ID) numbers, beam ID values, and beam ID orders included in the beam-related information for the two terminals with each other, and comparing ratios of staying time with respect to the beam IDs included in the beam-related information for the two terminals with each other.

According to an embodiment of the disclosure, the beam-related information may include information on at least one of a reason why a specific terminal configures a connection with the base station, a reason why the specific terminal releases the connection with the base station, IDs of serving beams experienced by the specific terminal while moving in the coverage area of the base station, staying time for which the specific terminal stays in the respective serving beams experienced by the specific terminal while moving in the coverage area of the base station, a handover out result, or a handover out target, wherein the information included in the beam-related information is stored as profiles of the plurality of terminals.

According to an embodiment of the disclosure, the method may further include determining whether a specific terminal moves along the detected path, wherein determining is performed through comparison to determine whether the beam measurement result reported by the specific terminal is similar to at least a part of the path.

According to an embodiment of the disclosure, the method may further include determining a serving beam ID allocated to the specific terminal, a serving beam order, and a serving beam allocation time based on the beam-related information corresponding to the detected path if it is determined that the specific terminal moves along the detected path.

According to an embodiment of the disclosure, the method may further include changing the serving beam of the specific terminal in accordance with the determined serving beam ID, serving beam order and serving beam allocation time if it is determined that the specific terminal moves along the detected path.

According to an embodiment of the disclosure, the message for supporting the mobility may include a handover command message indicating a handover to a target cell, wherein the handover command message includes information on the target cell and the first serving beam determined based on the beam-related information.

According to an embodiment of the disclosure, the information on the target cell and the first serving beam included in the handover command message may be generated based on the beam-related information on which the handover to the target cell has succeeded among the beam-related information for the plurality of terminals.

According to an embodiment of the disclosure, the handover command message may be transmitted to the terminal at a time determined based on the beam-related information on which the handover to the target cell has succeeded.

In accordance with another aspect of the disclosure, a base station is provided. The base station includes a transceiver configured to transmit and receive a signal, and a controller configured to generate beam-related information for a plurality of terminals from a beam measurement result received from the plurality of terminals, detect a path in a coverage area of the base station using the beam-related information, and transmit a message for supporting mobility based on the beam-related information to the terminal determined to move along the path.

According to an embodiment of the disclosure, because the base station can collect movement patterns and histories of the terminals and support mobility of the terminal based on this, a procedure related to the mobility of the terminal can be simplified.

According to an embodiment of the disclosure, because the terminal movement time, the target cell that is the object of movement, and the target beam can be obtained in advance, it is possible to prevent the electric field of the serving beam for the terminal from being abruptly dropped. Accordingly, stability of the communication connection between the terminal and the base station can be secured, and the user sensory communication performance can also be improved.

Technical tasks to be accomplished by the disclosure are not limited to those as described above, and unmentioned or other technical effects can be considered by those of ordinary skill in the art to which the disclosure pertains from embodiments of the disclosure to be described hereinafter.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is a diagram explaining a path detection process according to an embodiment of the disclosure;

Throughout the drawings, it should be noted that like reference numbers are used to depict the same or similar elements, features, and structures.

DETAILED DESCRIPTION

Figure 1:
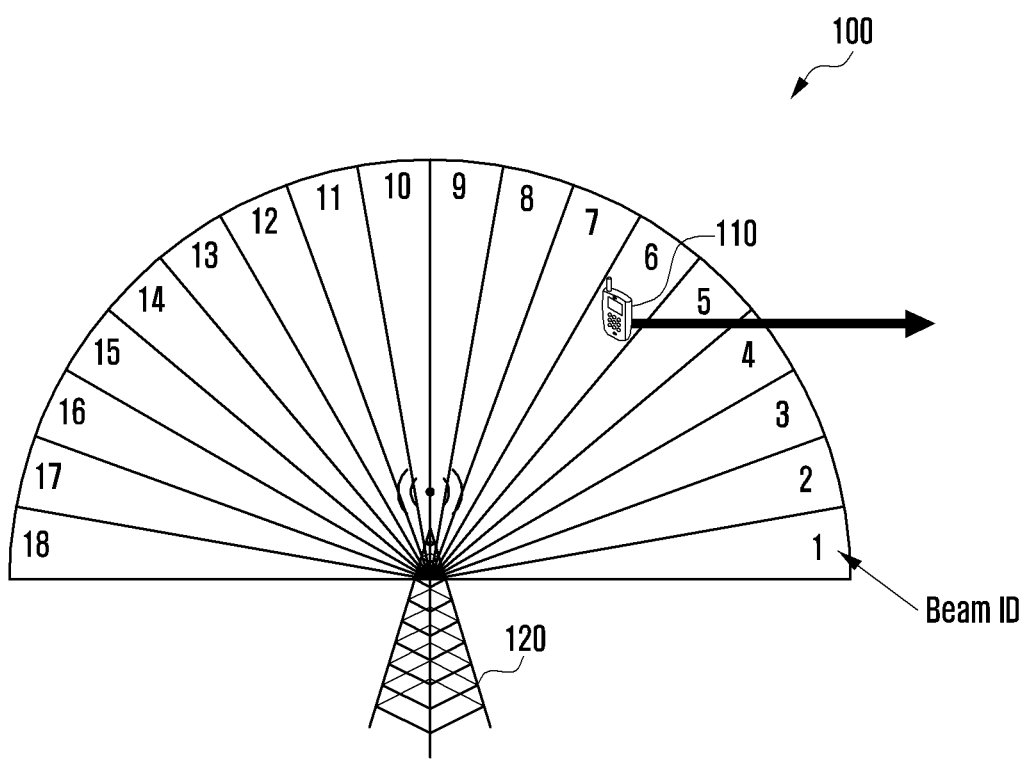
FIG. 1 is a diagram explaining a beam-based communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments in the description, explanation of the technical contents that are well-known in the technical fields to which the disclosure pertains and are not directly related to the disclosure will be omitted in the case where it is determined that they obscure the subject matter of the disclosure in unnecessary detail.

For the same reason, in the accompanying drawings, some constituent elements are exaggerated, omitted, or roughly illustrated. Further, sizes of some constituent elements may not completely reflect the actual sizes thereof. In the drawings, the same drawing reference numerals are used for the same elements across various figures.

The aspects and features of the disclosure and methods for achieving the aspects and features will be apparent by referring to the embodiments to be described in detail with reference to the accompanying drawings. However, the disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a non-transitory computer-usable or computer-readable memory that can direct a computer or another programmable data processing apparatus to function in a particular manner, such that the instructions stored in the non-transitory computer-usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~unit," as used in an embodiment, means, but is not limited to, a software or hardware component, such as field-programmable gate array (FPGA) or application-specific integrated circuit (ASIC), which performs certain tasks. However, "~unit" does not mean to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units." Further, the components and "~units" may be implemented to operate one or more central processing units (CPUs) in a device or a security multimedia card.

FIG. 1 is a diagram explaining a beam-based communication system according to an embodiment of the disclosure.

Referring to FIG. 1, a base station 120 of a beam-based communication system 100 operates a plurality of different beams in its coverage area. The plurality of beams formed by the base station 120 to transmit a signal may be discriminated by beam identifiers (IDs) allocated to the respective beams, and FIG. 1 exemplarily illustrates 18 beams that are a half of 36 beams operated by the base station 120.

A terminal 110 located in the coverage area of the base station 120 measures the beam power periodically or aperiodically, and reports the measured beam power to the base station 120. That is, the terminal 110 selects the best beam having the best beam reference signal received power among the transmitted beams of the base station 120 to report the selected best beam to the base station 120, and the base station 120 selects a serving beam of the terminal 110 based on the result reported by the terminal 110 and performs communication with the terminal 110.

Through the beam-based communication as described above, the base station 120 can obtain a specific location and staying time of the terminal 110 in the coverage area in a further subdivided unit than a cell unit. Further, because the mobility function of the terminal 110 is supported through beam change and handover, the mobility of the terminal can be guaranteed in a beam-to-beam manner.

Figure 2:
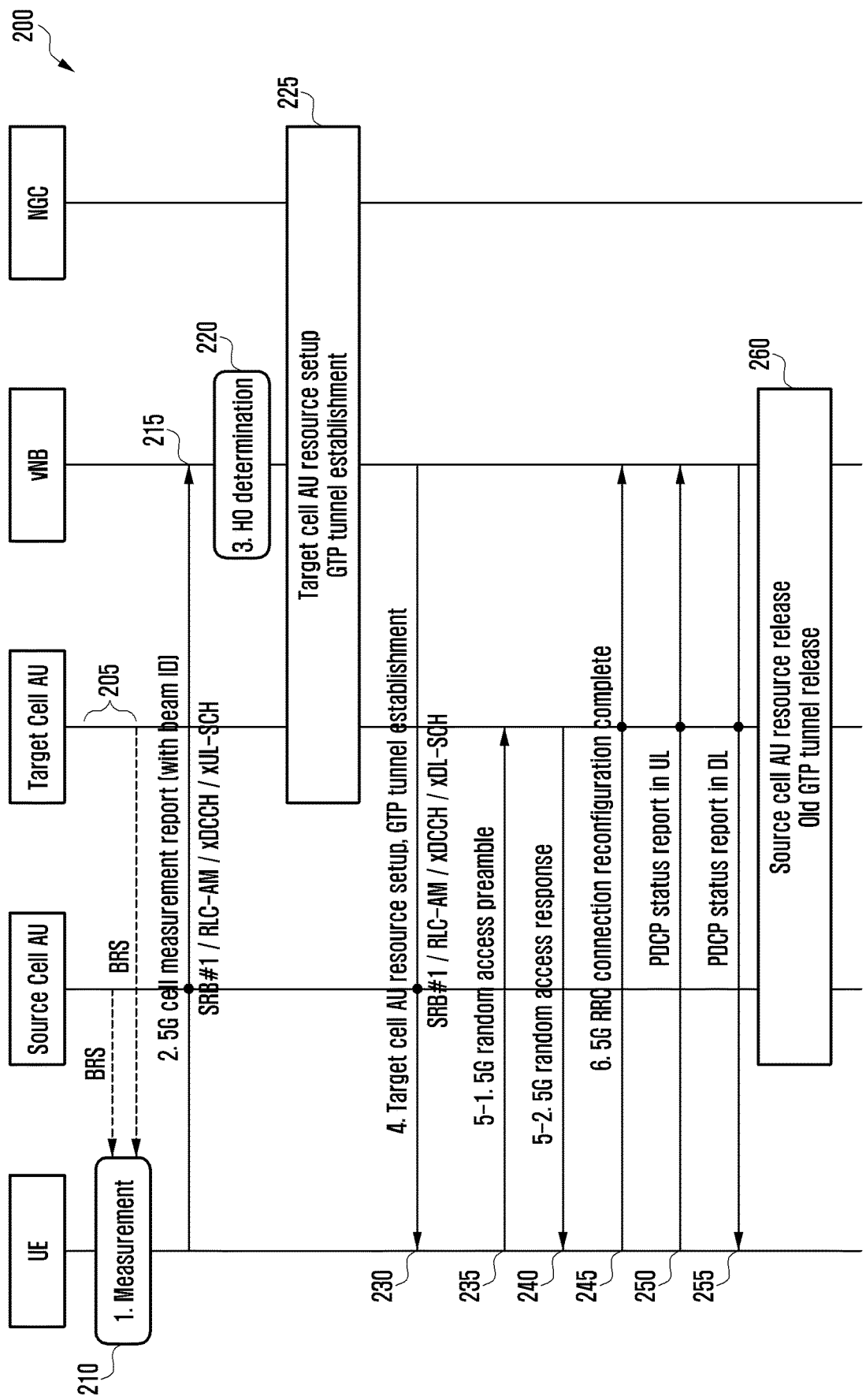
FIG. 2 is a diagram explaining a handover procedure in a 5th generation (5G) communication system according to an embodiment of the disclosure.

FIG. 2 is a diagram explaining a handover procedure in a 5th generation (5G) communication system according to an embodiment of the disclosure.

Referring to FIG. 2, a case is illustrated where a function split scheme is applied, in which partial layer functions of a base station are implemented in different entities. In entities illustrated as a source cell access unit (AU) and a target cell AU in the handover procedure 200 of FIG. 2, functions of physical (PHY), media access control (MAC), and partial radio link control (RLC) layers among layer functions of the base station in the related art can be implemented, whereas in a base station entity illustrated as vNB, functions of the remaining RLC, packet data convergence protocol (PDCP), and radio resource control (RRC) layers can be implemented. However, such a function split scheme is merely exemplary, and any other function split schemes can be implemented between AU and vNB. Further, the following explanation can also be applied to a handover procedure between the source cell and the target cell in which the function split is not applied. Hereinafter, both the entity (AU) including the partial functions including the PHY and the entity (vNB) including the partial functions including the RRC can be called "base stations."

The 5G communication system also maintains the handover function to support mobility of a terminal, which may also be referred to as a user equipment (UE). Briefly, two kinds of handover can be defined: First is a network-controlled handover that is similar to the handover in the related art, and second is a UE-based handover provided against an abrupt loss of the electric field. FIG. 2 exemplarily illustrates a general network-controlled handover procedure.

As described above, in the beamforming-based communication system, respective AUs transmit beam reference signals (BRSs) for beam measurement to the terminal at operation 205, and the terminal measures received powers of the BRS received from neighboring base stations at operation 210, and reports the measurement result (5G cell measurement report in FIG. 2) to the base station (vNB) at operation 215. In such a 5G cell measurement report process, the terminal can report, to the base station, the beam ID of the best beam, i.e., the beam having the best beam received power measured.

If an event occurs, in which the power of the BRS transmitted from the AU of an adjacent target cell is better than the power of the BRS transmitted from the AU of the current serving cell, the base station (vNB) having received a report of the measurement result from the terminal determines a handover of the terminal at operation 220. Then, the base station configures a resource for the target cell AU to support the terminal and establishes a general packet radio service (GPRS) tunneling protocol (GTP) tunnel at operation 225 in association with network entities of a next generation core (NGC) network.

The base station commands the terminal to perform a handover by transmitting an RRC connection reconfiguration message including a "MobilityControlInfo" parameter to the terminal at operation 230, and the terminal having received this transmits a random access preamble to the AU of the target cell at operation 235, and receives a random access response at operation 240 to access the target cell. The terminal having accessed the target cell transmits an RRC connection reconfiguration complete message to the base station (vNB) at operation 245, and then performs a PDCP status report procedure with respect to a downlink and an uplink at operations 250 and 255. If the handover procedure is completed, the radio resource for the source cell AU is released, and the previous GTP tunnel is also released at operation 260.

As described above, even in the beamforming-applied communication system, the handover procedure can be performed to support the mobility of the terminal.

Figure 3:
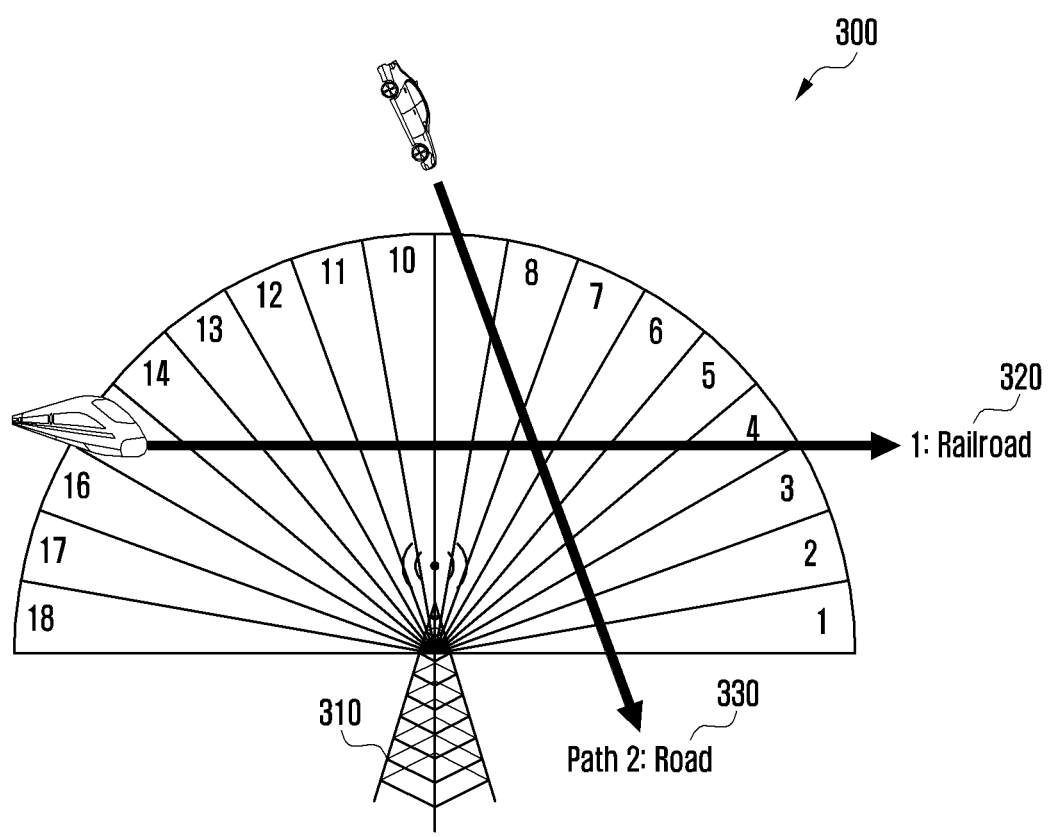
FIG. 3 is a diagram explaining a communication environment according to an embodiment of the disclosure.

FIG. 3 is a diagram explaining a communication environment 300 according to an embodiment of the disclosure.

Referring to FIG. 3, a diagram explains another example of a beamforming-based communication environment as described above with reference to FIG. 1.

As described above, in a beamforming-based communication environment, a base station 310 communicates with a terminal using a plurality of different beams. In this case, in order to determine a serving beam for the terminal, the base station periodically or aperiodically receives a report of the beam measurement result from the terminal, and in an environment where the terminal moves at a high speed, reliability of the beam measurement result may not be sufficiently secured. For example, in case of a terminal of a user traveling on a high-speed train, a terminal in a vehicle moving along a highway, or a passenger's terminal, the best beam may have already been changed while performing a beam measurement and reporting the result of the beam measurement. In this case, it may be an inaccurate and inefficient process to select the serving beam in accordance with the report of the terminal, and it is necessary to improve such a process.

FIG. 3 illustrates a case where the terminal moves along a predetermined path in a coverage area of the base station 310. That is, in FIG. 3, a terminal of a user traveling on a high-speed train moves along a path 320 while the high-speed train travels along a railroad, and a terminal of a vehicle or a passenger's terminal moves along a path 330 while the vehicle travels on a highway.

In this case, even though the terminal that moves along the path 320 or 330 moves at a high speed, the mobility of the terminal is relatively constant. That is, because a plurality of terminals moving along the path 320 that is a railroad and the path 330 that is a highway move in the same direction or in very similar directions, beam changes of the base station 310, which are experienced by the respective terminals, are completely the same as or extremely similar to one another. As a specific example, the terminals moving along the path 320 experience the beam changes in the order of beam IDs of 15, 14, 13, 12, 11, 10, 9, 8, 7, 6, 5, and 4, and the terminals moving along the path 330 experience the beam changes in the order of beam IDs of 9, 8, 7, 6, 5, 4, 3, 2, and 1. If the terminals moving along such fixed paths move at substantially constant speed in the coverage area of the base station 310, the ratio of times for the plurality of beams to the whole time that the terminals experience in the coverage area may also be similar to one another.

Hereinafter, an embodiment will be described in detail, which supports terminal mobility in consideration of the characteristics of terminals moving along fixed paths in the beamforming communication system environment as described above.

Figure 4:
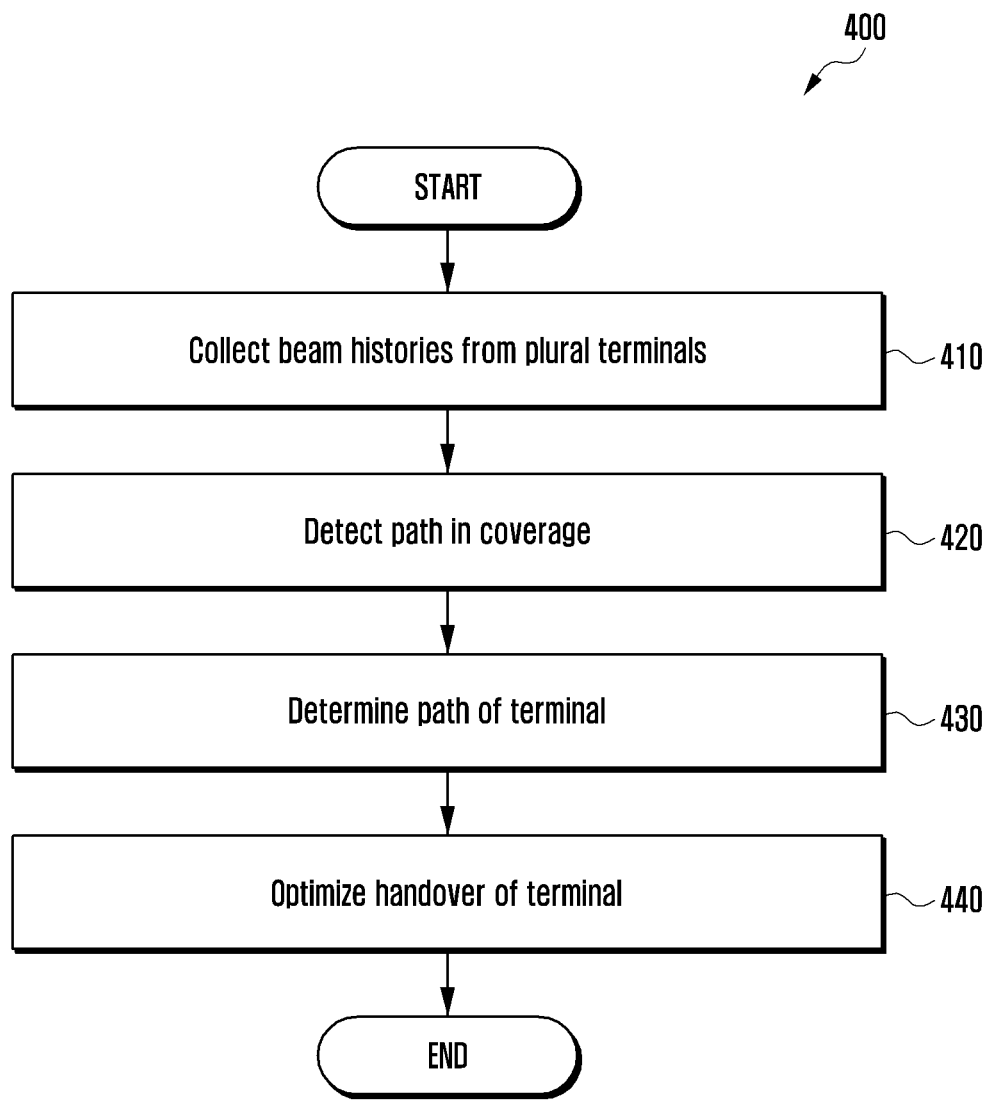
FIG. 4 is a flowchart illustrating an operation method by a base station according to an embodiment of the disclosure.

FIG. 4 is a flowchart illustrating an operation method by a base station according to an embodiment of the disclosure.

Referring to FIG. 4, first, a base station according to the operation method 400 collects a beam history from a plurality of terminals located in the coverage area of the base station itself at operation 410. Collection of the beam history means that the base station receives, stores, and manages the beam measurement results that are periodically or aperiodically reported by the plurality of terminals. A terminal moving along a path will report a change of the best beam experienced by the terminal to the base station, and the base station may store acquired beam-related history information if the beam measurement result is reported from the terminal. The beam history information may include one or more of beam-related information, such as a beam ID of the best beam reported by the terminal, the total time for which the terminal experiences the best beam, and the reception strength of the best beam experienced by the terminal.

The base station detects paths in the coverage area of the base station at operation 420. Detection of the paths may mean detection of routes on which terminals located in the coverage area of the base station tend to move. The base station may detect the paths in which the terminals in the coverage area move relatively fixedly by comparing and analyzing beam histories collected from the plurality of terminals. Referring to FIG. 3 as an example, the base station 310 can detect a first path 320 and a second path 330 located in the coverage area. One or more paths may exist in the coverage area of the base station, and a detailed process in which the base station detects the paths will be described with reference to FIGS. 5 and 6.

The base station, having detected the paths, determines whether the terminal moving in the coverage area of the base station move along the paths at operation 430. That is, the base station determines whether the terminals connected to the base station to receive services and move in the paths previously detected at operation 420, and such a determination process may be performed based on beam-related information that the terminals report to the base station. The base station can determine whether the terminals, having reported the beam-related information, move in one or more paths detected at operation 420 by comparing the beam-related information reported by the terminals with the beam history possessed by the base station itself. Such a determination process will be described in detail with reference to FIG. 7.

The base station, having determined that the terminals have moved in the paths, performs a procedure for optimizing handover of the corresponding terminals at operation 440. By analyzing the beam histories collected at operation 410, the base station can identify a target cell of the terminals out of the coverage area of the base station through the handover connect to, and can identify what serving beam is allocated to the terminals while connecting to the corresponding target cell. Accordingly, if the terminal that is identified as moving in the path at operation 430 continues movement along the path, the base station can predict or estimate what serving beam of what target cell the terminal will connect to. Accordingly, the base station can include such information in a message (e.g., a handover-related message or a handover command message) transmitted to the terminal to support the mobility of the terminal, and thus unnecessary signaling overhead or delay that would otherwise be required for the terminal to connect to the target cell can be reduced. A detailed handover optimization process will be described with reference to FIG. 8.

FIG. 5 is a diagram explaining a path detection process according to an embodiment of the disclosure.

Referring to FIG. 5, a table 500 exemplifies a method by a base station, which has collected beam-related information reported by a terminal, for storing and managing a beam history. The configuration of the beam history illustrated in FIG. 5 is merely exemplary, and the base station may further add and manage other parameters from the beam-related information reported by the terminal, or may store and manage the beam history except for parts of the contents illustrated in FIG. 5.

Referring to FIG. 5, the beam history information may include a specific beam ID, a staying time (i.e., a duration) in an area corresponding to the corresponding beam ID, a performance index, and other information. The beam history information may be managed by terminals through accumulation and storing of the beam-related information reported by the terminal through beam measurement. The beam-related information may be stored and managed in the form of a beam-related profile for each terminal.

As illustrated in FIG. 5, the terminal reports the beam-related information to the base station just after configuring a connection with the base station, and such a connection may occur due to various causes, such as call setup, handover-in (i.e., a received handover), and RRC connection reestablishment. The base station can manage such connection configuration causes as a "Start Cause" item. Thereafter, the terminal reports the beam-related information periodically or aperiodically until the connection with the base station is released, and the base station can manage various connection release causes, such as call release and handover-out (i.e., a handover to a target cell), as an "End Cause" item.

While the connection is maintained, the terminal periodically or aperiodically reports the beam-related information to the base station, and the beam-related information may be the beam ID of a beam measured by the terminal with a best reception strength. If the terminal successively reports the best beams, the base station can store the beam IDs reported by the terminal in association with the staying times in the corresponding beam. If the same beam ID is continuously reported, it means that the staying time in the corresponding beam area is relatively long. Further, the base station may also manage the beam-related information based on the received signal strength reported by the terminal in the corresponding beam area in association with the performance index.

If the best beams of the beam-related information that the base station receives from a specific terminal for each unit time $T_s$ is $b_1, b_2, b_3, b_4, \ldots, b_k$, the terminal can determine that the staying time for which the terminal stays in an area corresponding to a specific beam is the time for which the same beam ID is continuously received. An example is shown in Table 1 below.

TABLE 1

| | $b_1$ | $b_2$ | $b_3$ | $b_4$ | $b_5$ | $b_6$ | $b_7$ | $b_8$ | $b_9$ | ... |
|---|---|---|---|---|---|---|---|---|---|---|
| Beam ID | 5 | 12 | 12 | 12 | 12 | 12 | 12 | 12 | 13 | ... |

Thus, if beam IDs are reported as in Table 1 above, the base station can estimate that the terminal stays in an area in which the beam ID number is 12 for the time $T=7*T_s$ in total. The base station can track how long each terminal stays in an area corresponding to what beam in the coverage area of the base station itself, and it can store and manage the same in the form of the table (or profile for the terminal) illustrated in FIG. 5. As described above, the terminal may release the connection for various causes in the coverage area of the base station, and in this case, the terminal may perform a handover to another base station due to the mobility of the terminal. In this case, the base station stores the result of the handover-out in the beam history to manage the result of the handover-out. If the handover-out has succeeded, the base station may store and manage the ID of a target cell to which the terminal connects through the handover together with the beam ID of the target cell allocated to the terminal when the terminal first connects to the target cell.

The base station determines whether the terminals in the coverage area of the base station move along the paths based on the beam history information as described above with reference to FIG. 5, and hereinafter, with reference to FIGS. 6 and 7, this will be described in detail.

The base station derives paths existing in the coverage area before determining whether the terminals move in the paths.

Figure 6:
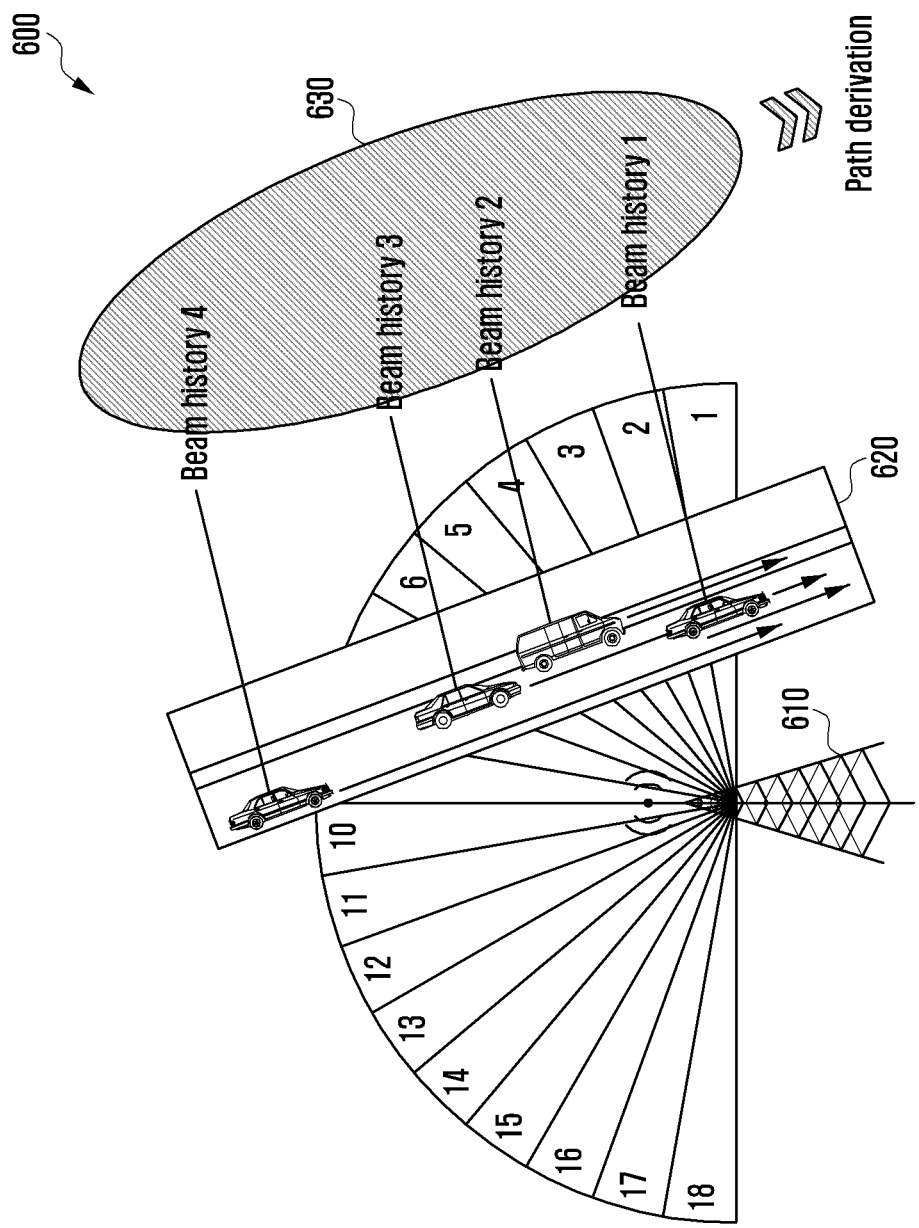
FIG. 6 is a diagram explaining a path derivation process according to an embodiment of the disclosure.

FIG. 6 is a diagram explaining a path derivation process according to an embodiment of the disclosure.

Referring to FIG. 6, in the path derivation process 600, the base station 610 continuously receives reports of beam-related information from the plurality of terminals moving along a path 620. In this case, the terminals moving along the path 620 move on a fixed route (e.g., a road) that is the path 620, the orders of beams experienced by the terminals are extremely similar to one another. In the example as illustrated in FIG. 6, the terminals moving along the path 620 have an extremely high probability that they report the best beams in the order of beams 9, 8, 7, ..., and 1. In other words, the plurality of terminals moving along the path 620 report the beam-related information at different time points and intervals, but the orders of beam IDs reported by the respective terminals and the ratios of staying times will be mostly the same as or extremely similar to one another. In other words, the base station configures and stores the beam-related information (i.e., beam profile) reported by the terminals moving along the path 620 as the beam histories 630, and if the beam histories have high similarity, the base station can recognize the corresponding beam history as a specific path.

A detailed process in which the base station recognizes the paths and determines movement of the terminals on the paths will be described with reference to FIG. 7.

Figure 7:
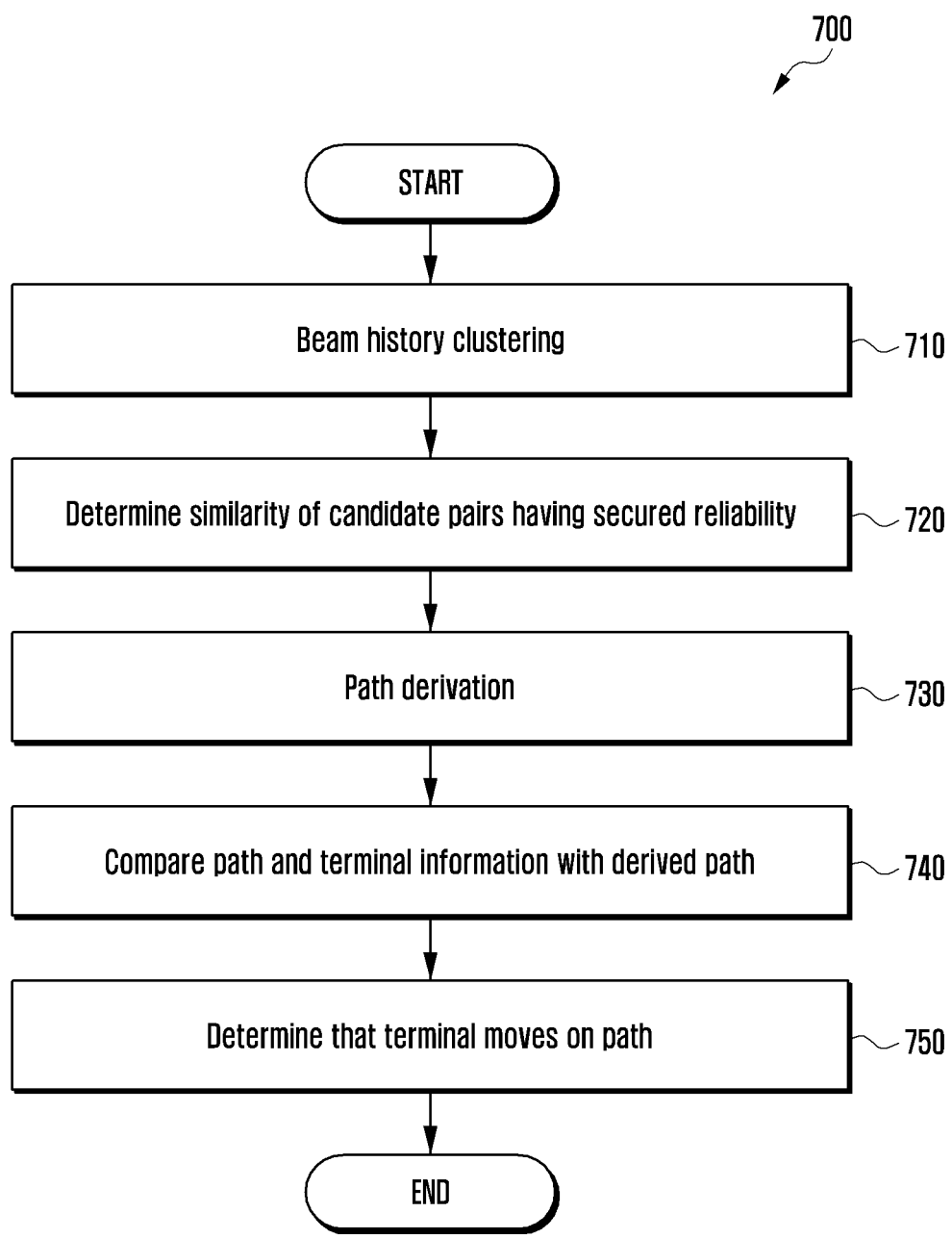
FIG. 7 is a flowchart illustrating a terminal path determination process according to an embodiment of the disclosure.

FIG. 7 is a flowchart illustrating a terminal path determination process according to an embodiment of the disclosure.

Referring to FIG. 7, first, the process 700 in which the base station recognizes the paths may start through clustering of beam history information at operation 710. The clustering process may be performed, for example, whenever the number of gathered beam histories (i.e., profiles) that the base station collects from terminals in a cell becomes equal to or larger than a predetermined number, or the clustering process may be performed at specific time intervals, or the clustering process may be aperiodically performed in accordance with an input of an enterpriser or a manager.

In the clustering process, the base station considers that a candidate pair having the total staying time of $5*T_s$ or less has low reliability in a list of candidate pairs each of which is composed of a "beam ID" and a "staying time," and excludes the low reliability candidate pair from the candidate pair list. In other words, if the total number of reports of the terminal in the beam history possessed with respect to a specific terminal is smaller than a predetermined number, the base station may exclude the corresponding history from the path derivation process. Such a threshold number of reports may be adjusted to another value. According to an embodiment, the beam history candidate pair that is a target of clustering can correspond to only the beam history candidate pair in the case where a connection to a target cell through a handover in the coverage area of the base station has succeeded. This is because only information of the terminal that has handover-out from the coverage area through the handover success can be used for other terminals.

Then, the base station performs a clustering process with respect to the candidate pairs having secured reliability, and determines similarity between the candidate pairs at operation 720. The similarity determination process is performed through selection of two of a plurality of beam history candidate pairs, and it is performed with respect to the number of all cases where two of all beam history candidate pairs having the secured reliability are selected.

For example, presume that a beam history candidate pair reported by the first terminal is $U_{i,1}=\{b_{i,1}, t_{i,1}\}$, and that i may be an ID of a beam experienced by the corresponding terminal. Similarly, presume that the beam history candidate pair reported by the second terminal is $U_{i,2}=\{b_{i,2}, t_{i,2}\}$. Then, the base station first compares the numbers of IDs of beams included in the two beam history candidate pairs $U_{i,1}$ and $U_{i,2}$ with each other. If the numbers of IDs of beams included in the two beam history candidate pairs are not equal to each other, there is a high possibility that two terminals move along different paths. If numbers of IDs of beams included in the two beam history candidate pairs are equal to each other, the base station determines whether values and orders of beam IDs $\{b_{i,1}\}$ and $\{b_{i,2}\}$ included in the two candidate pairs are equal to each other. This process can be expressed as in Equation 1 below.

$$\text{if } \{b_{1,1}, b_{2,1}, b_{3,1}, b_{4,1}, \ldots, b_{i,1}\} = \{b_{1,2}, b_{2,2}, b_{3,1}, b_{4,2}, \ldots, b_{i,2}\} \text{ or not} \qquad \text{Equation 1}$$

If the Equation 1 is satisfied, the base station determines similarity by comparing beam IDs included in the two beam history candidate pairs and corresponding staying times with each other. Such a process can be performed in accordance with Equation 2 below.

$$\sqrt{\frac{(t_{1,1}/T_1 - t_{1,2}/T_2)^2 + (t_{2,1}/T_1 - t_{2,2}/T_2)^2 + \ldots +}{(t_{i,1}/T_1 - t_{i,2}/T_2)^2}} < \varepsilon \quad \text{Equation 2}$$

In the Equation 2, $T_1 = t_{1,1} + t_{2,1} + t_{3,1} + \ldots + t_{i,1}$ and $T_2 = t_{1,2} + t_{2,2} + t_{3,2} + \ldots + t_{i,2}$ mean the total times for which two terminals that are targets of comparison stay in the coverage area of the base station, and $t_{i,j}$ means the time for which the j-th terminal stays in an area corresponding to the i-th beam ID. In the Equation 2, the reason why (i.e., cause) the staying time is divided into $T_1$ and $T_2$ is to derive an accurate result through comparison of the ratios of the times experienced by the two terminals to the total time in the case where the terminals move at different speeds. In the Equation 2, because the term "i" corresponds to the number of all beam IDs included in the beam history candidate pair, and the numbers of beams experienced by the two terminals are equal to each other, the term "i" will be equally applied to the two terminals. The left side of the Equation 2 corresponds to the resultant value obtained by comparing differences between the staying times with each other for the two terminals, and if the resultant value on the left side of the Equation 2 is smaller than $\varepsilon$ on the right side, it can be considered that the staying times experienced by the two terminals are similar to each other. The value of $\varepsilon$ is a certain adjustable value, and as the value is configured to be low, the similarity between the terminals can be determined.

If the Equation 2 is satisfied, the base station can determine that the terminals corresponding to two candidate pairs that are the targets of comparison have passed through the same path in the coverage area, and the path can be derived through definition thereof in Equation 3 below at operation 730.

$$P_n = \{B_{i,n}, T_{i,n}, N\} \quad \text{Equation 3}$$

$$\{B_{1,n}, B_{2,n}, B_{3,n}, B_{4,n}, \ldots, B_{i,n}\} =$$

$$\{B_{1,1}, B_{2,1}, B_{3,1}, B_{4,1}, \ldots, B_{i,1}\} =$$

$$\{B_{1,2}, B_{2,2}, B_{3,2}, B_{4,2}, \ldots, B_{i,2}\}$$

$$\{T_{1,n}, T_{2,n}, T_{3,n}, \ldots, T_{i,n}\} = \left\{ \frac{\frac{t_{1,1}}{T_1} + \frac{t_{1,2}}{T_2} + \ldots}{N}, \frac{\frac{t_{2,1}}{T_1} + \frac{t_{2,2}}{T_2} + \ldots}{N}, \frac{\frac{t_{3,1}}{T_1} + \frac{t_{3,2}}{T_2} + \ldots}{N}, \ldots, \frac{\frac{t_{i,1}}{T_1} + \frac{t_{i,2}}{T_2} + \ldots}{N} \right\}$$

According to an embodiment of the disclosure, the handover command message may be transmitted to the terminal at a time determined based on the beam-related information on which the handover to the target cell has succeeded.

In the Equation 3, $P_n$ means a derived path, and n means a path index in the coverage area. N means the number of terminals having passed through the path (i.e., the number of beam histories), and it becomes N=2 at an initial path derivation time. B means a set of beam IDs included in the path, and the number and the order of the beam IDs are the same as the number and the order of the beam IDs experienced by a candidate pair. T means a reference time experienced by a terminal that moves along a corresponding path, and as described above with reference to the Equation 2, it may be a ratio of a time for which the terminal stays in a specific beam ID area to an entire experience time.

Then, if a specific path is derived, the base station can determine similarity through comparison of another beam history possessed by the base station itself with the derived path $P_n$. That is, operation 720 can be repeatedly performed with respect to the entire beam history candidates possessed by the base station. Through such a process, resultant values moving along a specific route are accumulated and corrected, and thus the derived path can be strengthened, and the accuracy and reliability of the path can be gradually improved.

Specifically, Equation 4 below is similar to the Equation 1, but it is different from the Equation 1 on the point that two initial candidate pairs are not compared with each other, but the order of the already derived paths $P_n$ is compared with the order of beam IDs of a beam history of a new terminal.

$$\text{if } \{b_{1,1}, b_{2,1}, b_{3,1}, b_{4,1}, \ldots, b_{i,1}\} = \{b_{1,n}, b_{2,n}, b_{3,n}, b_{4,n}, \ldots, b_{i,n}\} \text{ or not} \quad \text{Equation 4}$$

Then, if the Equation 4 is satisfied, it is determined through comparison whether the ratios of staying times by beam IDs of the corresponding terminal to the staying times of the paths $P_n$ are similar to each other, and the comparison can be performed in accordance with Equation 5 below.

$$\sqrt{\frac{(t_{1,1}/T_1 - t_{1,n}/T_n)^2 + (t_{2,1}/T_1 - t_{2,n}/T_n)^2 + \ldots +}{(t_{i,1}/T_1 - t_{i,n}/T_n)^2}} < \varepsilon \quad \text{Equation 5}$$

where $T_n = T_{1,n} + T_{2,n} + T_{3,n} + \ldots + T_{i,n}$

If the Equation 5 is satisfied, it can be determined that the terminal having reported the corresponding beam profile passes through the path $P_n$, and the path can be strengthened in accordance with Equation 6 below. The base station can update $P_n$ in accordance with the following Equation 6.

$$N_{new} = N_{old} + 1 \quad \text{Equation 6}$$

$$\{T_{1,n}, T_{2,n}, T_{3,n}, \ldots, T_{i,n}\} = \left\{ \frac{t_{1,1} \times N_{old} + t_{1,2}}{N_{new}}, \frac{t_{2,1} \times N_{old} + t_{2,2}}{N_{new}}, \frac{t_{3,1} \times N_{old} + t_{3,2}}{N_{new}}, \ldots, \frac{t_{i,1} \times N_{old} + t_{i,2}}{N_{new}} \right\}$$

In accordance with the above-described procedure, the base station determines whether the corresponding terminal moves on the already derived path by comparing beam-related information reported by a new terminal with the already derived path at operations 740 and 750. A process in which the base station determines that the specific terminal moves on the corresponding path will be described in detail with reference to FIG. 8, and separately from such a determination process, the base station can continuously update a database of the paths using the beam-related information of the specific terminal.

Then, through such path derivation and terminal determination, a process in which a base station supports mobility of a terminal will be described.

Figure 8:
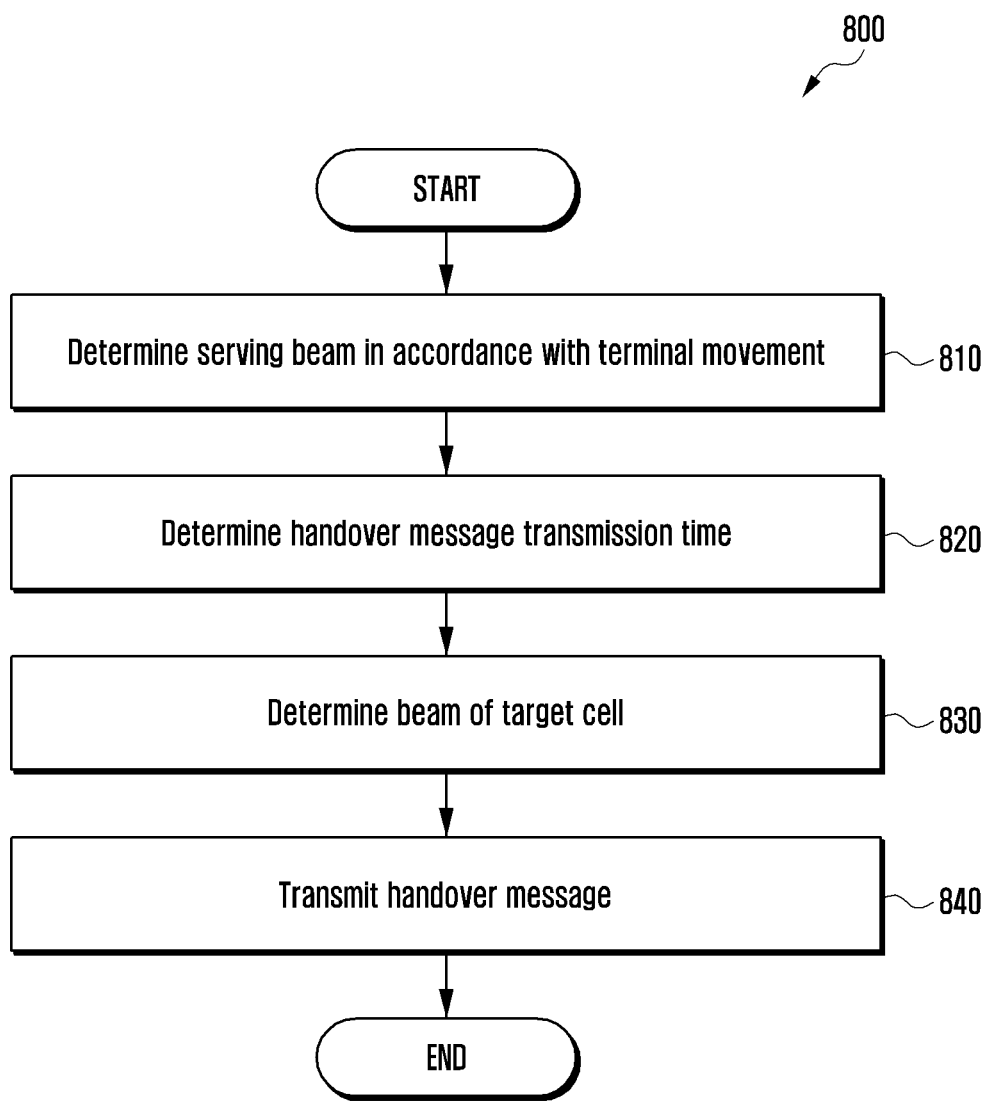
FIG. 8 is a flowchart illustrating a terminal mobility support process according to an embodiment of the disclosure.

FIG. 8 is a flowchart illustrating a terminal mobility support process (according to an embodiment of the disclosure).

Referring to FIG. 8, as described above with reference to FIG. 4, in the terminal mobility support process 800, the base station can optimize the handover procedure by supporting mobility of the terminal that is determined to move on a path. This is because the path derived in accordance with the process as described above with reference to FIGS. 5, 6, and 7 is performed using a beam history of the terminal that has moved to a coverage area of another cell by successfully performing the handover. That is, the derived path reflects the result that a specific terminal has succeeded in connecting from the base station to a neighboring base station, and if the specific terminal that is determined to move on the path performs the handover in accordance with the result that the previous terminals have succeeded, there is a very high probability that the specific terminal will successfully connect to the neighboring base station.

Based on this, operation 740 of FIG. 7 will be described in more detail. The base station first identifies whether beam-related information reported by a certain terminal corresponds to at least a part of a derived path in order to determine whether a specific terminal moves along the path. This process can be performed in accordance with Equation 7 below.

$$\text{if } \{b_1, b_2, b_3, b_4, \ldots, b_i\} = \{b_{1,n}, b_{2,n}, b_{3,1}, b_{4,n}, \ldots, b_{j,n}\}$$
or not  Equation 7

In the Equation 7, j may mean the number of beam IDs reported by a terminal until a comparison time, and it may have a value that is smaller than the total number i of beam ID sets included in a path. That is, a base station determines, through comparison, similarity among a collected beam ID reported by a specific terminal in the coverage area, a staying time candidate pair and a beam ID of a path, and a part of a staying time candidate pair. If it is determined that the beam ID values and orders are the same in accordance with the Equation 7, staying time ratios are compared with each other in accordance with Equation 8 below.

$$\sqrt{\frac{(t_1/T - T_{1,n}/T_n)^2 +}{(t_2/T - T_{2,n}/T_n)^2 + \ldots + (t_j/T - T_{j,n}/T_n)^2}} < \varepsilon_2$$

Equation 8 where $T = T_1 + T_2 + T_3 + \ldots + T_j$,
$T_n = T_{1,n} + T_{2,n} + T_{3,n} + \ldots + T_{j,n}$ Further, $\varepsilon_2$ is a certain adjustable value, and the Equation 8 corresponds to a process of determining whether a ratio of a staying time of a terminal that satisfies the Equation 7 until the j-th beam ID is similar to a ratio of a staying time of a path. If the Equation 8 is satisfied, the base station can determine that the corresponding terminal is passing through a part of a path $P_n$, and the corresponding terminal can be estimated to pass through areas $\{B_{j+1,n}, B_{j+2,n}, \ldots, B_{i,n}\}$ corresponding to the remaining beam IDs on the path $P_n$. Further, the base station can estimate that the corresponding terminal will stay in the areas corresponding to the respective beam IDs that the corresponding terminal will pass through as long as a time expressed in Equation 9 below.

$$\tilde{t}_{j+1} = T_{j+1,n} \times \frac{t_{j-1}}{T_{j-1,n}}$$

$$\tilde{t}_{j+2} = T_{j+2,n} \times \frac{t_{j-1}}{T_{j-1,n}}$$

$$\tilde{t}_i = T_{i,n} \times \frac{t_{j-1}}{T_{j-1,n}}$$

Equation 9

Accordingly, because the base station can predict the beam ID that the corresponding terminal will pass through, the base station can determine what serving beam is to be allocated to the terminal in order to communicate with the terminal as the terminal moves forward at operation 810. Then, the base station can calculate how much time the terminal will stay in areas corresponding to the respective beam IDs, and thus it can predict the time when it allocates the corresponding serving beam to the terminal through $\tilde{t}_{j+1}, \tilde{t}_{j+2}, \ldots, \tilde{t}_i$. Accordingly, the base station can change the serving beam even if a separate feedback or beam-related information on the beam measurement result is not reported from the terminal at a predicted time.

The base station already knows what target cell the terminal will perform a handover to on a path and information on a serving beam to be first allocated in the target cell. That is, because the path is derived from beam histories of the terminals having succeeded in handover, the base station can determine the time to transmit a handover command message to the terminal at operation 820, and can also determine the ID of the target cell that is a target of handover and the first serving beam to be allocated in the target cell at operation 830.

Accordingly, the base station transmits, to the terminal, a handover message including information on the target cell ID and the beam ID of the target cell at operation 840, and the time when the handover command message is transmitted is the time derived at operation 820, and may be a proper time when the terminal should prepare the handover before moving away from the coverage area of the base station. In other words, the base station refers to histories of other terminals having succeeded in handover, and if a specific terminal moves on the same path as the path of the corresponding terminal, the base station can prevent unnecessary overhead and delay due to handover failure by optimizing the handover time and procedure of the specific terminal. The handover preparation process is quite time-consuming because of the terminal mobility, and if the terminal performs the handover in a state where the terminal already knows a target cell and what serving beam is to be used, stability of the handover can be greatly secured. In particular, in the case of a terminal moving at high speed, the time required for handover preparation is shortened, and thus greater advantage can be obtained by the operations according to the embodiments.

Figure 9:
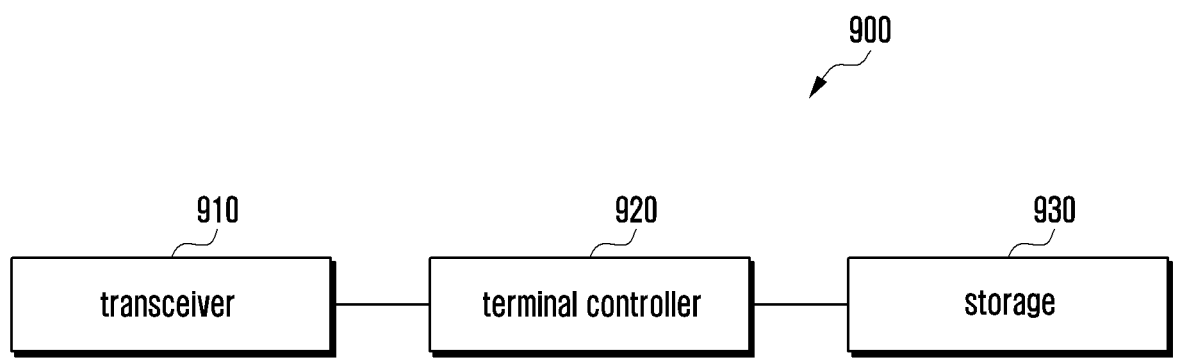
FIG. 9 is a diagram illustrating the structure of a terminal according to an embodiment of the disclosure.

FIG. 9 is a diagram illustrating the structure of a terminal according to an embodiment of the disclosure.

Referring to FIG. 9, a terminal 900 may include a transceiver 910, a terminal controller 920, and a storage 930. In the disclosure, the terminal controller 920 may be defined as a circuit or application-specific integrated circuit or at least one processor.

The transceiver 910 transmits and receives signals with another network entity. The transceiver 910 may receive, for example, a synchronization signal from a base station, and may be implemented in the form of a radio frequency (RF) unit including a modem.

The terminal controller 920 may control the overall operation of the terminal according to an embodiment proposed in the disclosure. For example, the terminal controller 920 may control the transceiver 910 and the storage 930 to perform operations according to the embodiment as described above with reference to the drawings. Specifically, the terminal controller 920 may measure the beam-related information from the beam received from the base station to report the measurement result to the base station, and may perform communication with the base station through allocation of the serving beam from the base station. Further, the terminal controller 920 may perform a handover to an adjacent target cell using information included in the handover message received from the base station.

The storage 930 may store at least one of information transmitted and received through the transceiver 910 or information generated through the terminal controller 920.

Figure 10:
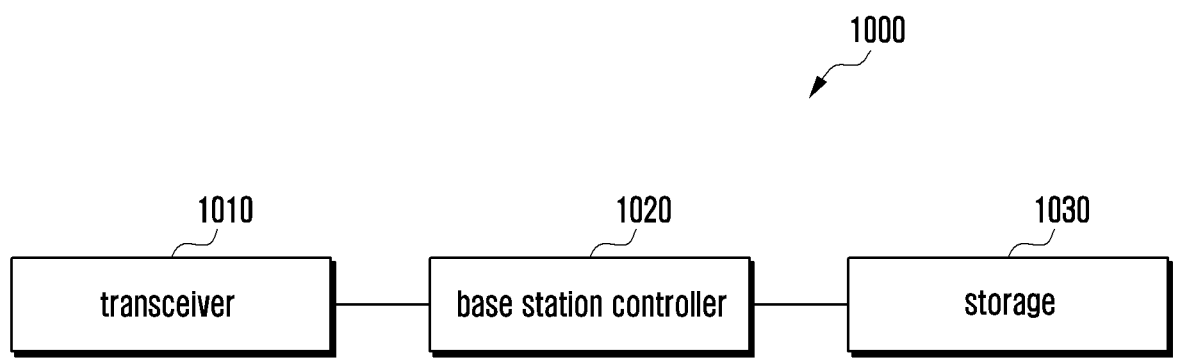
FIG. 10 is a diagram illustrating the structure of a base station according to an embodiment of the disclosure.

FIG. 10 is a diagram illustrating the structure of a base station according to an embodiment of the disclosure.

Referring to FIG. 10, a base station 1000 may include a transceiver 1010, a base station controller 1020, and a storage 1030. In the disclosure, the base station controller 1020 may be defined as a circuit or application-specific integrated circuit or at least one processor.

The transceiver 1010 transmits and receives signals with another network entity. The transceiver 1010 may transmit, for example, a synchronization signal to a terminal, and may be implemented in the form of an RF unit including a modem.

The base station controller 1020 may control the overall operation of the base station according to an embodiment proposed in the disclosure. For example, the base station controller 1020 may control the transceiver 1010 and the storage 1030 to perform operations according to the embodiment as described above with reference to the drawings. Specifically, the base station controller 1020 may store and manage a beam history of the terminal from the beam measurement result received from the terminal, detect a path in the coverage area based on the stored beam history, and determine whether terminals move on the path. Further, the base station controller 1020 may select the optimum beam in accordance with the mobility of the terminal to allocate the selected optimum beam to the terminal as the serving beam, and transmit, to the terminal, a handover related message including information on the target cell and the specific beam so that the terminal performs the handover.

The storage 1030 may store at least one of information transmitted and received through the transceiver 1010 or information generated through the base station controller 1020.

According to the embodiment as described above, it is possible to reduce the signaling overhead and delay that may occur as the terminal moves in the beamforming-applied communication system. In particular, the handover procedure of the terminal moving at high speed can be optimized, and the user sensory performance can also be improved.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method by a base station for supporting mobility of a terminal in a beamforming-based wireless communication system, the method comprising:
generating beam-related information for a plurality of terminals from a beam measurement result received from the plurality of terminals;
identifying a similarity between beam-related information of two or more terminals among the plurality of terminals;
identifying a path in a coverage of the base station based on the identified similarity; and
transmitting a message for supporting mobility based on the beam-related information to the terminal determined to move along the path.

2. The method of claim 1, wherein the identifying the path further comprises:
determining that a route in which the two or more terminals move forms the path in case that the similarity satisfies a specific condition.

3. The method of claim 2, wherein the identifying of the similarity comprises:
comparing a number of beam identifiers (IDs), a value of beam IDs, and an order of beam IDs included in the beam-related information for the two or more terminals with each other; and
comparing ratios of staying time with respect to the beam IDs included in the beam-related information for the two or more terminals with each other.

4. The method of claim 1,
wherein the beam-related information comprises information on at least one of a reason why a specific terminal configures a connection with the base station, a reason why the specific terminal releases the connection with the base station, identifiers (IDs) of serving beams experienced by the specific terminal while moving in the coverage of the base station, a staying time for which the specific terminal stays in the respective serving beams experienced by the specific terminal while moving in the coverage of the base station, a handover out result, or a handover out target, and
wherein the information included in the beam-related information is stored as profiles of the plurality of terminals.

5. The method of claim 1, further comprising determining whether the terminal moves along the detected path,
wherein determining is performed through comparison to determine whether the beam measurement result reported by a specific terminal is similar to at least a part of the path.

6. The method of claim 5, further comprising determining a serving beam identifier (ID) allocated to the specific terminal, a serving beam order, and a serving beam allocation time based on the beam-related information corresponding to the detected path in case that it is determined that the specific terminal moves along the detected path.

7. The method of claim 6, further comprising changing a serving beam of the specific terminal in accordance with the determined serving beam ID, the serving beam order, and the serving beam allocation time in case that it is determined that the specific terminal moves along the detected path.

8. The method of claim 1,
wherein the message for supporting the mobility comprises a handover command message indicating a handover to a target cell, and
wherein the handover command message includes information on the target cell and a first serving beam determined based on the beam-related information.

9. The method of claim 8, wherein the information on the target cell and the first serving beam included in the handover command message is generated based on the beam-related information on which the handover to the target cell has succeeded among the beam-related information for the plurality of terminals.

10. The method of claim 9, wherein the handover command message is transmitted to the terminal at a time determined based on the beam-related information on which the handover to the target cell has succeeded.

11. A base station for supporting mobility of a terminal in a beamforming-based wireless communication system, the base station comprising:

a transceiver configured to transmit and receive a signal; and
a controller configured to:
generate beam-related information for a plurality of terminals from a beam measurement result received from the plurality of terminals,
identify a similarity between beam-related information of two or more terminals among the plurality of terminals,
identify a path in a coverage of the base station based on the identified similarity, and
transmit a message for supporting mobility based on the beam-related information to the terminal determined to move along the path.

12. The base station of claim 11, wherein the controller is further configured to:
determine that a route in which the two or more terminals move forms the path in case that the similarity satisfies a specific condition.

13. The base station of claim 12, wherein the controller is further configured to:
compare a number of beam identifiers (IDs), a value of beam IDs, and an order of beam IDs included in the beam-related information for the two or more terminals with each other, and
compare ratios of staying time with respect to the beam IDs included in the beam-related information for the two or more terminals with each other.

14. The base station of claim 11,
wherein the beam-related information comprises information on at least one of a reason why a specific terminal configures a connection with the base station, a reason why the specific terminal releases the connection with the base station, identifiers (IDs) of serving beams experienced by the specific terminal while moving in the coverage of the base station, a staying time for which the specific terminal stays in the respective serving beams experienced by the specific terminal while moving in the coverage of the base station, a handover out result, or a handover out target, and
wherein the information included in the beam-related information is stored as profiles of the plurality of terminals.

15. The base station of claim 11, wherein the controller is further configured to determine whether a specific terminal moves along the detected path, and perform comparison to determine whether the beam measurement result reported by the specific terminal is similar to at least a part of the path.

16. The base station of claim 15, wherein the controller is further configured to determine a serving beam identifier (ID) allocated to the specific terminal, a serving beam order, and a serving beam allocation time based on the beam-related information corresponding to the detected path in case that it is determined that the specific terminal moves along the detected path.

17. The base station of claim 16, wherein the controller is further configured to change a serving beam of the specific terminal in accordance with the determined serving beam ID, the serving beam order, and the serving beam allocation time in case that it is determined that the specific terminal moves along the detected path.

18. The base station of claim 11,
wherein the message for supporting the mobility comprises a handover command message indicating a handover to a target cell, and
wherein the handover command message includes information on the target cell and a first serving beam determined based on the beam-related information.

19. The base station of claim 18, wherein the information on the target cell and the first serving beam included in the handover command message is generated based on the beam-related information on which the handover to the target cell has succeeded among the beam-related information for the plurality of terminals.

20. The base station of claim 19, wherein the handover command message is transmitted to the terminal at a time determined based on the beam-related information on which the handover to the target cell has succeeded.

* * * * *